US006880288B1

(12) United States Patent
Hanes

(10) Patent No.: US 6,880,288 B1
(45) Date of Patent: Apr. 19, 2005

(54) REMOVABLE AND INTERCHANGEABLE LIMITED RESISTANCE DIVE-ACTION BAIT-NAVIGATING FISHING BOBBER

(76) Inventor: Dorothy Marie Hanes, 2271 Bethel Hygiene Rd., Bethel, OH (US) 45106

( * ) Notice: Subject to any disclaimer, the term of this patent is extended or adjusted under 35 U.S.C. 154(b) by 40 days.

(21) Appl. No.: 10/700,109

(22) Filed: Nov. 3, 2003

(51) Int. Cl.[7] ............................................. A01K 95/00
(52) U.S. Cl. .................... 43/44.87; 43/42.39; 43/44.92
(58) Field of Search .......................... 43/42.39, 44.87, 43/44.92

(56) References Cited

U.S. PATENT DOCUMENTS

| | | | |
|---|---|---|---|
| 798,620 A * | 9/1905 | Persing | 43/44.92 |
| 2,315,048 A | 3/1943 | Croft | |
| 2,741,864 A * | 4/1956 | Shotton | 43/44.9 |
| 3,056,229 A | 10/1962 | Haney | |
| 3,744,176 A * | 7/1973 | Bondhus | 43/43.14 |
| 4,418,492 A | 12/1983 | Rayburn | |
| 4,574,515 A | 3/1986 | Garner | |
| 4,748,760 A | 6/1988 | Widmer | |
| 4,845,885 A * | 7/1989 | Rubbelke | 43/44.95 |
| 5,243,780 A * | 9/1993 | Christensen | 43/44.87 |
| 5,404,668 A | 4/1995 | Christensen | |
| 5,608,985 A | 3/1997 | Kainec | |
| 5,775,025 A * | 7/1998 | Ooten | 43/43.1 |
| 5,953,852 A | 9/1999 | Nichols | |
| 6,550,179 B1 * | 4/2003 | Seay | 43/44.88 |
| 6,571,506 B1 | 6/2003 | Hunsinger | |

FOREIGN PATENT DOCUMENTS

| DE | 3501553 A1 * | 7/1986 |
|---|---|---|
| GB | 2125263 A * | 3/1984 |

* cited by examiner

Primary Examiner—Peter M. Poon
Assistant Examiner—Bethany L. Griles

(57) ABSTRACT

A removable and interchangeable limited resistance dive-action bait-navigating fishing bobber comprising, a substantially flat floatant body of an inverted tear drop design having a bottom slot containing a top notch for receiving a fishing line and a bottom notch for receiving a weight, a conical shaped weight having front and back ear extensions with a connecting rod that interlocks into the bottom notch of the slot in the floatant body retaining the weight to the floatant body. The top of the ear extensions forms a hole in the top notch of the slot retaining the bobber to the fishing line. The weight is removable from the floatant body when the rod is pulled out of the bottom notch allowing the bobber to be removed from the fishing line and the floatant body and weight to be interchangeable with other weights and bodies.

5 Claims, 2 Drawing Sheets

REMOVABLE AND INTERCHANGEABLE LIMITED RESISTANCE DIVE-ACTION BAIT-NAVIGATING FISHING BOBBER

This invention relates to an improved limited resistance dive-action bait-navigating fishing bobber, especially to an improved limited resistance dive-action bait-navigating fishing bobber that is removable from a fishing line having a weighted body that is interchangeable with different weights or the weight is interchangeable with different bodies providing substantially improved fishing to fishermen.

BACKGROUND OF THE INVENTION

Fishing floats and bobbers of prior art are commonly used to float bait or suspend bait in a body of water. Bobber and floats also allow the fisherman to visibly watch to see if a fish is striking at the attached bait by the movement of the float or bobber on top of the water.

Floats and bobbers have been designed to float significantly above the water line to be highly visible to the fisherman. Some floats have been designed with brightly colored vanes extending above the water line for higher visibility and also designed for less resistance to the fish when pulled under the water by a hooked fish. Some are designed to be more aerodynamic for better casting. Bobbers and floats have been designed to float holding the bait in a fixed position below the water at a certain desired depth or to float in a slip mode allowing the bait to sink slowly allowing the fish to take the bait without detecting the bobber or float being attached. Other bobbers or floats have been designed to carry lights for attracting fish. Many different attachment means have been created for different floats and bobbers to serve the different purposes of the fisherman. Round, pencil shaped, high rising, lighted, aerodynamic, water weighted, wobbling, sound emitting and many more different designed bobbers and floats have come along, yet a problem with most is that they are limited to the area in which they float and limited in the functions they perform. The removable and interchangeable limited resistance dive-action bait-navigating fishing bobber of the applicants invention can float at the surface of the water or the fisherman may chose to dive and navigate the baited fishing line to a certain depth in the water in a controlled fashion. The weight of the applicants invention being removable from the floatant body allows the bobber to be easily attached or removed from the fishing line also allowing the body to be interchangeable with other weights or the weight interchangeable with other bodies allowing the fisherman to change the color or style body for attracting fish under different circumstances or change the weight size for fishing at different depths.

The prior art of the limited resistance fishing bobber does not provide a removable bobber that allows the weight and floatant material to be removable and interchangeable with other weights and bodies for fishing under different circumstances, allowing the fisherman to change body color or style, or change to a different size weight to fish suspended at different levels in the water from top to bottom or fish deeper faster or slower depending on the weight. The ability to provide a limited resistance dive-action bait-navigating fishing bobber having all the benefits mentioned in the prior art and in addition the benefits mentioned in the applicants improved invention of a removable and interchangeable dive-action bait-navigating fishing bobber provides a substantial advantage to the fisherman in the effort to catch fish.

The limited resistance dive-action bait-navigating fishing bobber of U.S. Pat. No. 5,775,025 of (Ooten) was designed to float visibly at the top of the water and dive and navigate a baited fishing line through the water by the return action of the fishing line to the fisherman allowing the fisherman to search the water from top to bottom for fish in a controlled manner up and down through the water with a limited resistance to the water and to the bite of the fish. The limited resistance dive-action bait-navigating fishing bobber of U.S. Pat. No. 5,775,025 of (Ooten) is a diving fishing bobber of a simply constructed inverted tear-drop shaped flat floatant material with a small hole in the floatant material located at the bottom of the floatant material just above a weight. The weight is attached to the floatant material by threading a short piece of fishing line through the hole, REF. NUMERAL 2 of FIG. 3 of Ooten's drawings, in the bottom of the floatant material and also through the weight. A knot, REF. NUMERAL 5 of FIG. 4, is tied at the bottom of the weight securing the weight to the floatant material as depicted in FIG. 4 of U.S. Pat. No. 5,775,025 drawings. The fisherman's fishing line is then threaded through the same small hole in the bottom of the floatant material, REF. NUMERAL 10 of FIG. 5, and attached to a baited fishing hook. A slip shot sinker or bobber stop can be attached to the fishing line in between the bobber and the hook to allow the stop to secure behind the bobber when pulled through the water toward the fisherman allowing the bobber to dive the baited line by the force of the water against the weighted flat inverted tear-drop designed bobber through the return action of the line toward the fisherman. A problem with this design is the inability to remove the bobber from the line without cutting or untying the attached fishing line. The connection of the weight to the bobber using a small piece of fishing line to tie the weight to the bobber is time consuming and difficult to manufacture. The bobber of U.S. Pat. No. 5,775,025 does not allow the bobber to be removed from the fishing line without removing the bobber stop and cutting the fishing line to remove the hook. The body of the invention of U.S. Pat. No. 5,775,025 is not removable and interchangeable with other weights and bodies, as is the applicant's invention of a removable and interchangeable limited resistance dive-action bait-navigating fishing bobber, without cutting or untying the weight from the body. A removable means or interchangeable body adaptable to this design was unknown and unobvious in prior art and no mention of the possibility of a removable interchangeable bobber is conveyed in the language of U.S. Pat. No. 5,775,025 or in prior art.

Though many conventional bobbers are designed with attachment means to be removable, none of such design as that of the applicant's invention of a removable and interchangeable limited resistance dive-action bait-navigating fishing bobber. The ability to provide a removable and interchangeable limited resistance dive-action bait-navigating fishing bobber, as described in the applicant's invention, that has a weight that is removable from the floatant body that allows the bobber to be easily attached to and easily removed from a fishing line, the weight and floatant body being interchangeable with other weights and floatant bodies allowing the fisherman to change colors or style bodies or change weight size is an improvement that substantially adds to the ability of the fisherman to catch fish and to the marketability of the product. The applicant's invention of a removable and interchangeable limited resistance dive-action bait-navigating fishing bobber provides a substantially more desirable fishing tool to the fisherman.

Attachment means contained in that of prior art are not compatible in use with the design of the applicant's invention of a removable and interchangeable limited resistance dive-action bait-navigating fishing bobber that allows the bobber to be removed from the fishing line and be interchangeable with other weights and bodies. Nothing in prior art references a removable and interchangeable limited resistance dive-action bait-navigating fishing bobber of such design as is that of the applicant's invention.

U.S. Pat. No. 2,315,048 of Croft, describes a float that is readily and easily applied to or removed from a fishing line, wherein a pin in the bobber lines up with a slot in the body of the float where a line is laid in and the pin rotates to lock the line in allowing it to move freely on the line. A knot or stop is placed on the line to hold the bobber a certain distance from the bait determining the depth of fishing the bait on the line. The problem with this design of an attachment means is that it is not compatible with the design of the applicant's invention of a removable and interchangeable limited resistance dive-action bait-navigating fishing bobber. Croft's float is not designed for diving and makes no mention of the possibility for diving as does that of the applicant's invention. Croft's fishing line runs vertically from top to bottom of the float, the applicant's line runs horizontally through a hole created by attaching the weight to the floatant body of the bobber. The applicant's invention comprises a floatant body with a slot in the bottom. The slot has a top notch and a bottom notch. The top notch receives a fishing line, the bottom notch receives a weight that snaps into the notch in the bottom of the slot of the body holding the weight to the floatant body and holding the bobber to the fishing line. The weight being removable from the body by simply pulling the weight down and snapping the weight out of the bottom notch releasing the line allows the body and weight to be interchangeable with other bodies and weights.

U.S. Pat. Nos. 5,953,852, 3,056,229, 4,418,492, 4,575,515, and 5,608,985, describe different types of bobbers that are removable. None of the above mentioned patents have removable means adaptable to the function and design of the applicant's invention of the removable and interchangeable dive-action bait navigating fishing bobber. None of the above mentioned patents are weighted diving floats or bobbers that can dive and navigate a baited fishing line as does that of the applicant's invention. While prior efforts represent improved removable fishing bobbers, there remains a need for a limited resistance dive-action bait-navigating fishing bobber that can be attached to a fishing line that is easily removed from the fishing line and interchangeable providing the fisherman with a substantially improved limited resistance dive-action bait-navigating fishing bobber.

Through my searching and to my knowledge there are no bobbers or floats of prior art that are limited resistance dive-action bait-navigating fishing bobbers that are removable from a fishing line having interchangeable bodies and weights as that of the applicant's invention. The removable and interchangeable limited resistance dive-action bait-navigating fishing bobber of the applicant's invention provides a substantially improved fishing bobber allowing the fisherman a variety of choices for fishing under different circumstances within the scope of one device that substantially improves the chances of catching fish. The new and improved fishing bobber of the applicant's invention is not anticipated, suggested or rendered obvious in prior art. The combination as is that of the applicant's invention is unobvious in prior art. I am aware of no prior art of this design.

BRIEF SUMMARY OF THE INVENTION

In view of the foregoing it is a general object of the present invention to provide an improved version of a limited resistance dive-action bait-navigating fishing bobber.

Another object of the present invention is to provide a limited resistance dive-action bait-navigating bobber or float that can be quickly and easily attached to a fishing line and removed from the fishing line providing a substantially more useful and marketable product.

A further object of the applicant's invention is to provide a limited resistance dive-action bait-navigating fishing bobber that has a weight that is easily removable from the floatant material or bobber body allowing the bobber to be easily removed from the fishing line and allows the weight to be interchangeable with other bodies or the body of the bobber to be interchangeable with other weights. The weight and floatant body being interchangeable allows the fisherman to quickly change color or style body with a desired weight size for attracting fish under different circumstances or simply change the size of the weight used with a particular body that allows the fisherman to fish at a particular depth or different depth in the water from top to bottom or dive deeper more quickly the heavier the weight.

Yet another aspect of the present invention provides a removable and interchangeable limited resistance dive-action bait-navigating fishing bobber that has stabilizing fins for casting and diving under certain circumstances. The fins are positioned vertically from top to just above the weighted bottom in the approximate center of the bobber body. The body being interchangeable can be quickly changed to a body with stabilizing fins for windy conditions to help prevent the bobber body from spinning and tangling the fishing line. The body without fins provides a somewhat motion resistant bobber under windy conditions when fishing the surface.

Another aspect of the applicant's invention provides a removable and interchangeable limited resistance dive-action bait-navigating fishing bobber that has an elongated chamber contained near the center of the top portion of the tear drop shaped floatant material located inside between the front side and the back side of the floatant body for attaching or carrying a luminescent device such as a light stick.

In accordance with a further aspect of the present invention, in the preferred embodiment of the present invention there is provided a removable and interchangeable limited resistance dive-action bait-navigating fishing bobber that has a hollow body, wherein beads or the like may be added to the hollow body providing a noise effect or rattle when the fishing line is jerked or tugged by the fisherman to attract fish.

Though improvements have been made through the years in the prior art of fishing bobbers and floats there remains the need for an improved limited resistance dive-action bait-navigating fishing bobber that is easily removable from the fishing line having interchangeable parts allowing the fisherman a variety choices to enhance the chances of catching fish.

Slightly varied embodiments may be achieved of the applicant's invention for different reasons to attract fish retaining the integrity of the basic intension of design and function of the removable and interchangeable limited resistance dive-action bait-navigating fishing bobber of the applicant's invention.

REFERENCE NUMERALS IN THE DRAWINGS

Figure 1:
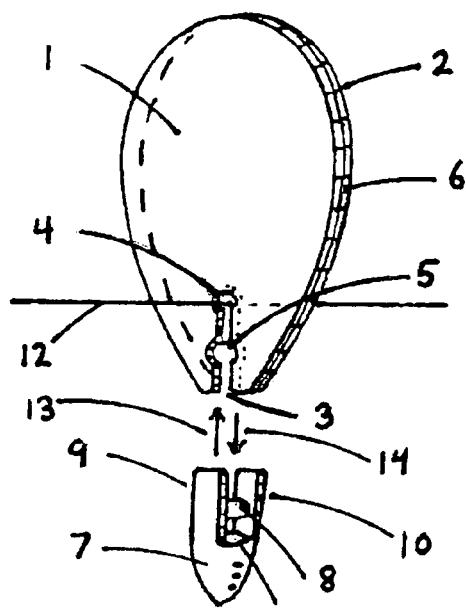
FIG. 1 is an exploded perspective view of the preferred embodiment of the present invention of the removable and interchangeable limited resistance dive-action bait-navigating fishing bobber showing removable bobber floatant body and weight and the direction the weight attaches to the notched slot in the floatant material or body attaching the bobber to the fishing line and the direction the weight is removed from the notched slot in the floatant material or body releasing the bobber from the fishing line.

1. The front of the inverted tear-drop shaped bobber body
2. The back of the inverted tear-drop shaped bobber body
3. The slot in the bottom of the floatant material of the bobber body
4. Top notch in slot in bottom of the floatant material of the bobber body
5. Bottom notch in slot in bottom of the floatant material of the bobber body
6. Seam of the preferred embodiment where front half of the floatant material of the bobber body joins back half of bobber body
7. Weight
8. Rod in weight
9. Front ear extension of weight
10. Back ear extension of weight
11. Top portion of base of weight
12. Fishing line
13. Arrow showing direction the weight is pushed to attach into the notched slot in bottom portion of the floatant material bobber body
14. Arrow showing direction the weight is pulled to detach from the notched slot in the bottom portion of the floatant material bobber body
15. Hole formed for attaching to fishing line
16. Chamber in the floatant bobber body for receiving luminescent light
17. Luminescent light stick
18. Beads
19. Front fin
20. Back fin

DETAILED DESCRIPTION OF THE INVENTION

Figure 3:
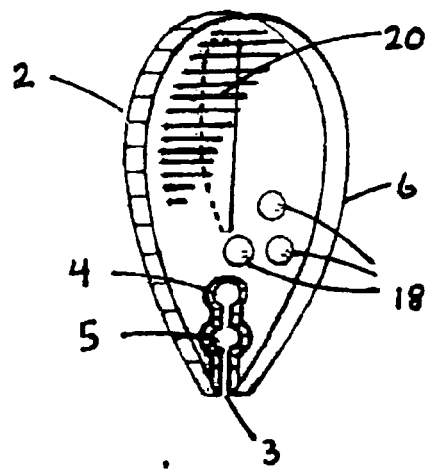
FIG. 3 shows the inside shell of the back half of the bobber body that forms a hollow body in the preferred embodiment and the back half edge that forms the seam where the front and back half come together. The embodiment for showing placement of a back fin and placement for beads or the like for rattle noise inside the hollow body is also depicted in FIG. 3.
Figure 4:
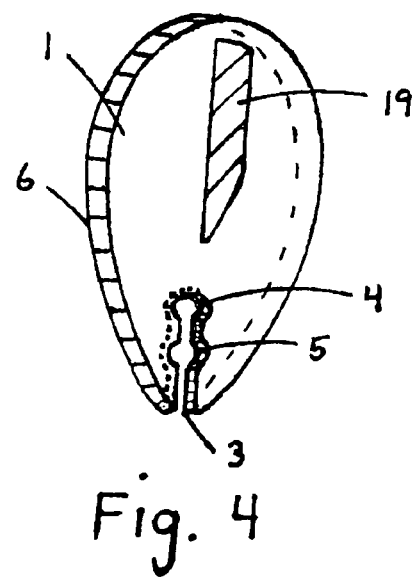
FIG. 4 shows the outside shell of the front half of the bobber body that forms a hollow body in the preferred embodiment and the front half edge that forms the seam where the front and back half comes together. The embodiment for showing placement of a front fin is also depicted in FIG. 4.

Referring now in detail to the drawings, the removable and interchangeable limited resistance dive-action bait-navigating fishing bobber comprises a buoyant body of any suitable material such as foam, rubber, wood or plastic. Though slight variations may be accomplished the preferred embodiment for this example being a substantially flat buoyant body, FIG. 1, of an inverted tear-drop shape that allows the bobber to dive with limited resistance, is made from molded plastic such a A.B.S. or polyethylene or any durable plastic suitable for forming a durable thin shell front half REF. NUMERAL 1 of FIGS. 1 and 4, having a slot REF. NUMERAL 3 of FIGS. 1 and 4, centered at the bottom of the inverted tear-drop shaped floatant body material and extending vertically upward approximately ¼ the length of the bobber body in the narrow bottom portion of the front half of the bobber body as depicted in FIGS. 1 and 4 of the applicant's drawings, the slot having a top notch REF. NUMERAL 4, and a bottom notch REF. NUMERAL 5 of FIGS. 1 and 4, and a thin shell back half REF. NUMERAL 2 of FIGS. 1 and 3, having a slot REF. NUMERAL 3 of FIGS. 1 and 3 centered at the bottom of the inverted tear-drop shaped floatant body material and extending vertically upward approximately ¼ the length of the bobber body in the narrow bottom portion of the back half of the bobber body as depicted in FIGS. 1 and 3, the slot having a top notch REF. NUMERAL 4, and a bottom notch REF. NUMERAL 5.

After the front and back halves of the bobber body have been molded the two halves are then welded or glued together forming a seam REF. NUMERAL 6, the glue may be waterproof glue suitable for the design, forming a buoyant inverted tear-drop shaped top portion of the bobber as seen in FIG. 1 of the applicants drawings. The bobber is then ready to receive the weight REF. NUMERAL 7 of FIG. 1. The weight for this example being of sufficient size and weight so as to let the buoyant bobber body float vertically upright in a body of water. In such cases where a heavier weight is desired for faster and deeper diving the bobber is carried to deeper depths, possibly to the bottom of the water where the bobbers floatant body would still be held in an upright position at the bottom. Variations of design of the weight may be achieved to accomplish the desired results of the applicant's invention, the design of the weight for this example has two rectangular shaped ear extensions REF. NUMERAL 9 and 10 of FIG. 1. The front ear extension of the weight REF. NUMERAL 9 is directly opposite the back ear extension of the weight REF. NUMERAL 10, located on the edge of the circumference formed by the top of the cone shaped base of the weight REF. NUMERAL 11 of FIG. 1. Each ear extension extends upward from the base of the weight approximately the length of the body of the bobber. The weight has a rod structure REF. NUMERAL 8 of FIG. 1, one end of the rod attached to and is perpendicular to the back of the front ear extension REF. NUMERAL 9, and the other rod end attached to and perpendicular to the back of the back ear extension REF. NUMERAL 10 vertically centered at the back of each ear extension at a point approximately mid way the length of both ear extensions, REF. NUMERAL 9 and 10, above the base of the cone shaped weight REF. NUMERAL 11. The cone shaped weight and rod of the weight of the applicant's invention can be made of steel, lead, brass, plastic or any substance suitable for the design and function of the weight of the applicants invention. For this example the weight and rod of the weight are made of stainless steel. The rod of the weight REF. NUMERAL 8 is attached to the ear extensions REF. NUMERAL 9 and 10 being soldiered in place or machined in place holding to the back of each ear extension forming a connection between the ear extensions of the weight REF. NUMERAL 7 of FIG. 1.

The bobber is now ready to attach to the fishing line. The exploded view of FIG. 1 of the applicant's drawings shows the fishing line REF. NUMERAL 12 of FIG. 1 pulled up into the top notch REF. NUMERAL 4 of the slot REF. NUMERAL 3 in the bottom of the bobber body of FIG. 1. The line is held in place in the top notch of the slot with one hand while the weight REF. NUMERAL 7 is pushed upward with the other hand as shown by arrow REF. NUMERAL 13 into the slot REF. NUMERAL 3 of the body until the rod of the weight REF. NUMERAL 8 snaps into the bottom notch REF. NUMERAL 5.

Figure 2:
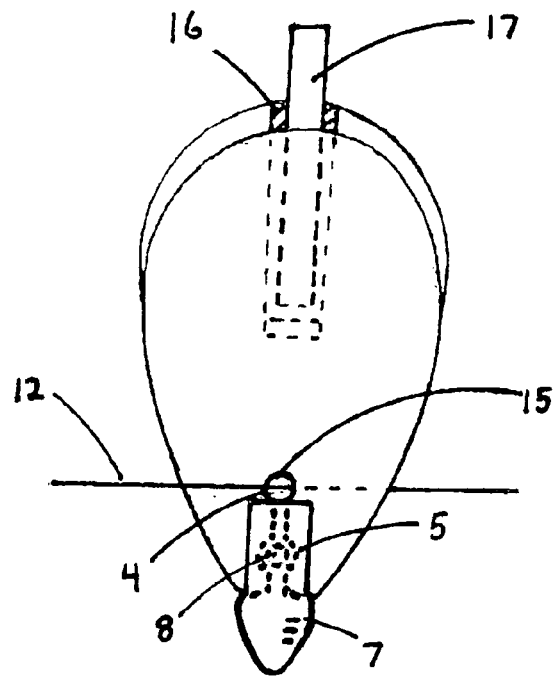
FIG. 2 shows the weight attached to the bottom notch in the slot in the bottom of the floatant material holding the weight to the floatant material body and forming a hole in the top notch of the slot, encompassing the fishing line holding the fishing line to the bobber, and also shows the embodiment having a hole in the top of the floatant material body forming a channel in the top portion of the bobber body for containing a luminescent light or light stick.

The top of both ear extensions REF. NUMERAL 9 and 10 meet the bottom of the top notch REF. NUMERAL 4 of the slot REF. NUMERAL 3 forming a complete circle or hole REF. NUMERAL 15 of FIG. 2 just above the top of the ear extensions, as seen in FIG. 2, extending through the bobber body from the front side to the back side of the bobber body allowing the fishing line to be held in the hole formed by top notch REF. NUMERAL 4 of FIG. 2 and the top of the ear extensions REF. NUMERAL 9 and 10 attaching the bobber to the fishing line REF. NUMERAL 12 allowing the bobber to slide on the fishing line or be locked into a fixed position at a desired point on the fishing line by line locking means chosen by the fisherman, such as bobber stop, or removable split shot. The attachment design of the removable and interchangeable limited resistance dive-action bait navigating fishing bobber of the applicant's invention allows the fisherman the ability to easily remove the weight from the floatant bobber body by pulling the weight down away from the bobber body as seen by the directional arrow REF. NUMERAL 14 of FIG. 1, slightly twisting the weight to either side. The weight can then be interchangeable with different color or style bodies or the body changed with different size weights and simply snapped back onto the fishing line.

Figure 5:
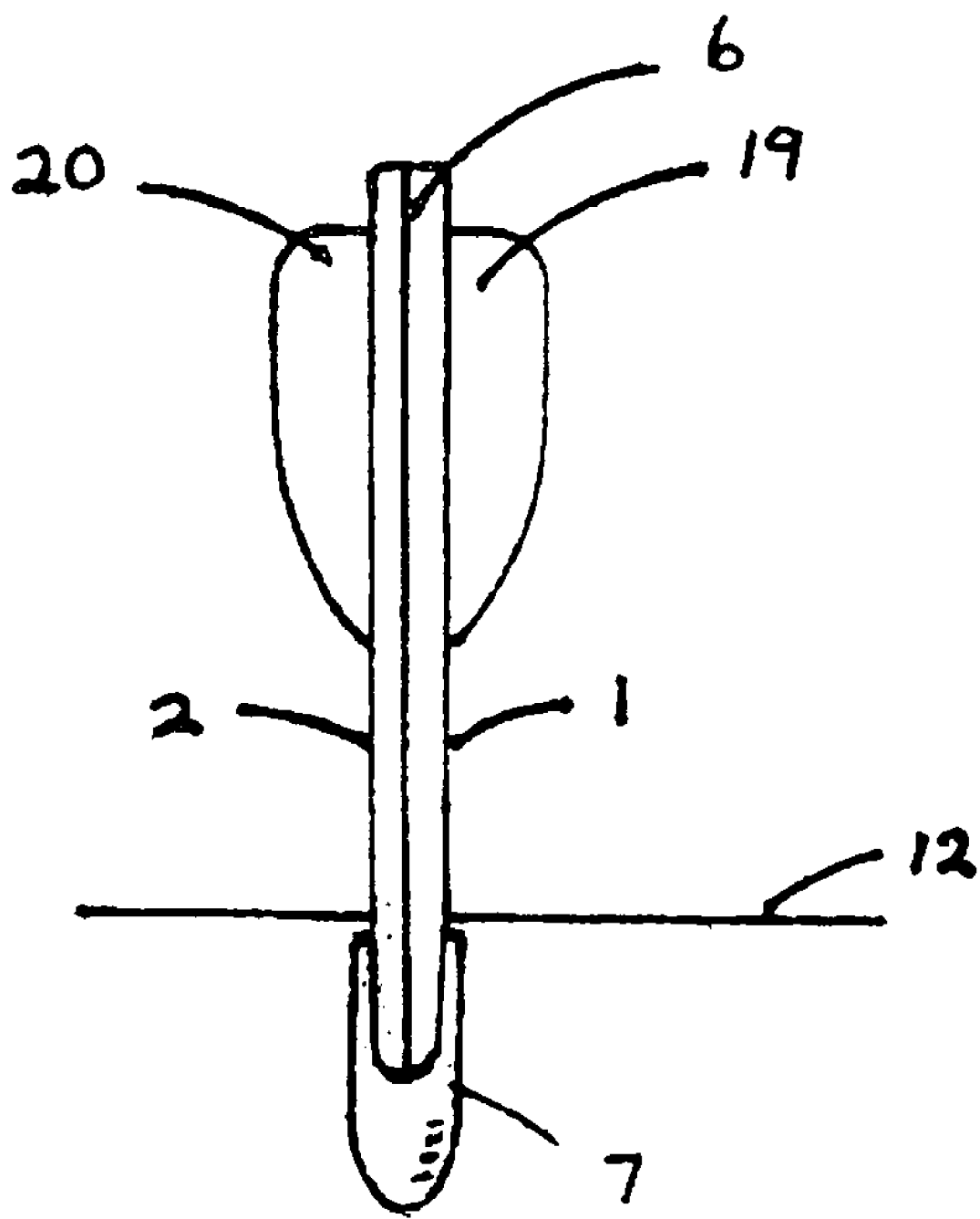
FIG. 5 shows the side view of the assembled bobber of the preferred embodiment attached to a fishing line, also showing another aspect of the preferred embodiment side view including front and back fins.

Another embodiment of the removable and interchangeable limited resistance dive-action bait-navigating fishing bobber of the applicant's invention allows for fins REF. NUMERAL 19 and 20 to be added to the bobber's floatant body as depicted in FIGS. 3, 4, and 5 of the applicant's drawings. In the preferred embodiment of the present invention molded plastic, the fin of REF. NUMERAL 19 is molded into the front half of the bobber body REF. NUMERAL 1 of FIG. 4. The fins can be any length for this example the front fin is approximately ½ the length of the bobber body and is located in the approximate center of the top of the front half of the bobber body at a slight distance down from the top of the bobber body extending vertically from top to bottom ending just below the midway point in the bobber body as seen in FIG. 4 of the applicant's drawings. The back fin REF. NUMERAL 20 is molded into the back half of the bobber body REF. NUMERAL 2 of FIG. 3. The back fin is approximately ½ the length of the bobber body and is located directly opposite the front fin in the approximate center of the top of the back half of the bobber body at a slight distance down from the top of the bobber body extending vertically from top to bottom ending just below the midway point in the bobber body as seen in FIG. 3 of the applicant's drawings. The front half and back half of the molded plastic body are then glued together forming the floatant body of the fishing bobber and the weights are added in the same manner as the embodiment without fins.

Another aspect of the applicant's invention provides the plastic molded body with a chamber REF. NUMERAL 16 pf FIG. 2 molded into and inside the bobber body running vertically through the bobber body from approximately center top to approximately midway down the bobber body of proportionate size and shape for receiving a luminescent light or light stick REF. NUMERAL 17 of FIG. 2.

In another aspect of the applicant's invention beads REF. NUMERAL 18 of FIG. 3 may be added inside the hollow body formed by the mold before the bobber is glued together providing the bobber with a rattle sound when the beads interact with each other and the plastic shell of the bobber body when pulled or jerked on the fishing line by the fisherman.

What I claim as my invention is:

1. A fishing bobber comprising:
   a tear drop shaped planar floatant material having a wide top portion, a narrow bottom portion, a substantially flat front side, a substantially flat back side, a slot centered vertically adjacent the narrow bottom portion of said planar floatant material extending through said planar floatant material from the front side to the back side, said slot having a top notch for receiving a fishing line and a bottom notch for receiving a weight
   a weight having a front ear extension and a back ear extension extending upward from a conical shaped base, said ear extensions parallel to each other at opposite sides above said conical shaped base, having a rod connecting between said ear extensions centered at a point of equal distance above said conical shaped base capable of interlocking with said bottom notch of said slot in said planar floatant material for securing said weight to said tear drop shaped floatant material forming a hole in said top notch of said slot in said floatant material for securing said fishing bobber to said fishing line, said bottom notch adapted to release said interlocking rod of said weight by pulling said weight in a downward direction from said bottom notch wherein said weight is removable from said floatant material releasing said fishing bobber from said fishing line wherein said weight and said floatant material are interchangeable with other weights and floatant material.

2. The fishing bobber of claim 1, further comprising a fin extending radially and extending vertically in the proximate center of the top portion of said front side of said tear drop shaped floatant material and a fin extending radially and extending vertically in the proximate center of the top portion of said back side of said tear drop shaped floatant material.

3. The fishing bobber of claim 1, further comprising a narrow hollow chamber extending vertically from the top of said tear drop shaped floatant material proximate midway down the center of said said tear drop shaped floatant material inside said floatant material between said front side and said back side of said tear drop shaped floatant material for receiving a luminescent device or light stick.

4. The fishing bobber of claim 1, wherein said tear drop shaped floatant material is hollow.

5. The fishing bobber of claim 4 wherein the hollow tear drop shaped floatant material contains beads for making rattle noises.

\* \* \* \* \*